United States Patent
Shen et al.

(10) Patent No.: US 11,004,372 B2
(45) Date of Patent: May 11, 2021

(54) CONTROLLING A SCANNING MIRROR SYSTEM

(71) Applicant: Microsoft Technology Licensing, LLC, Redmond, WA (US)

(72) Inventors: Wei Shen, Palo Alto, CA (US); Martin Francis Galinski, III, Santa Clara, CA (US); Brandon Baxter Harris, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/215,999

(22) Filed: Dec. 11, 2018

(65) Prior Publication Data

US 2020/0184868 A1    Jun. 11, 2020

(51) Int. Cl.
G09G 3/02      (2006.01)
G02B 26/08     (2006.01)
G02B 26/10     (2006.01)

(52) U.S. Cl.
CPC ......... *G09G 3/025* (2013.01); *G02B 26/0816* (2013.01); *G02B 26/10* (2013.01); *G09G 2310/067* (2013.01); *G09G 2310/08* (2013.01)

(58) Field of Classification Search
CPC combination set(s) only.
See application file for complete search history.

(56) References Cited

U.S. PATENT DOCUMENTS

| | | | |
|---|---|---|---|
| 7,177,063 B2 | 2/2007 | Krylov et al. | |
| 7,952,783 B2 | 5/2011 | Holmes et al. | |
| 9,310,606 B2 | 4/2016 | Wenzler et al. | |
| 9,354,441 B2 | 5/2016 | Iyad Al Dibs | |
| 9,798,136 B2 | 10/2017 | Lemaire et al. | |
| 2006/0265163 A1* | 11/2006 | Lewis | G05B 13/042 702/85 |
| 2012/0281024 A1* | 11/2012 | Champion | H04N 9/3129 345/690 |
| 2013/0003026 A1 | 1/2013 | Rothaar | |

(Continued)

FOREIGN PATENT DOCUMENTS

EP    2818909 A1    12/2014
JP    2011215324 A   10/2011

OTHER PUBLICATIONS

"MEMS mirrors", Retrieved <<https://www.hamamatsu.com/resources/pdf/ssd/mems_mirror_koth9003e.pdf>>, Sep. 2016, 14 Pages.

(Continued)

*Primary Examiner* — Deeprose Subedi
(74) *Attorney, Agent, or Firm* — Alleman Hall Creasman & Tuttle LLP

(57) ABSTRACT

Examples are disclosed herein related to controlling a scanning display system. One example provides a display device comprising a light source, a scanning mirror system configured to scan light from the light source, and a controller configured to control the scanning mirror system to scan the light by synthesizing in a time domain a mirror control waveform that comprises a linear scan portion and a retrace portion stitched to the linear scan portion, the mirror control waveform being continuous and having an arbitrary timing that is adjustable by the controller between scan cycles.

18 Claims, 8 Drawing Sheets

(56) References Cited

U.S. PATENT DOCUMENTS

| | | | |
|---|---|---|---|
| 2013/0100098 A1* | 4/2013 | Shen ................. | G02B 26/0841 |
| | | | 345/208 |
| 2013/0120819 A1* | 5/2013 | Rothaar .............. | H04N 9/3135 |
| | | | 359/224.1 |
| 2017/0070714 A1 | 3/2017 | Honkanen et al. | |
| 2017/0285327 A1 | 10/2017 | Duvdevany et al. | |
| 2019/0094667 A1* | 3/2019 | Morarity ............. | H04N 9/3129 |

OTHER PUBLICATIONS

"International Search Report and Written Opinion Issued in PCT Application No. PCT/US19/064338", dated Apr. 2, 2020, 18 Pages.

* cited by examiner

CONTROLLING A SCANNING MIRROR SYSTEM

BACKGROUND

A display device may scan light from a light source to produce a viewable image. Various types of scanning mechanisms may be used, including but not limited to scanning mirrors.

SUMMARY

Examples are disclosed herein related to controlling a scanning display system. One example provides a display device comprising a light source, a scanning mirror system configured to scan light from the light source, and a controller configured to control the scanning mirror system to scan the light by synthesizing in a time domain a mirror control waveform that comprises a linear scan portion and a retrace portion stitched to the linear scan portion, the mirror control waveform being continuous and having an arbitrary timing that is adjustable by the controller between scan cycles.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Some scanning display systems may scan light from a light source in a first direction (e.g. vertically) at a slower rate and a second direction (e.g. horizontally) at a faster rate to raster scan an image for display. In such a display, the slow scanning direction may utilize a sawtooth ramp trajectory waveform, with repetitive frequency determined by the display frame rate. Various types of scanning mirrors may be used, including but not limited to micro-electro-mechanical system (MEMS) mirrors. Portable display devices may utilize MEMS-based microdisplay technologies due to their ability to provide high image quality and their relatively small size and weight.

Figure 1:
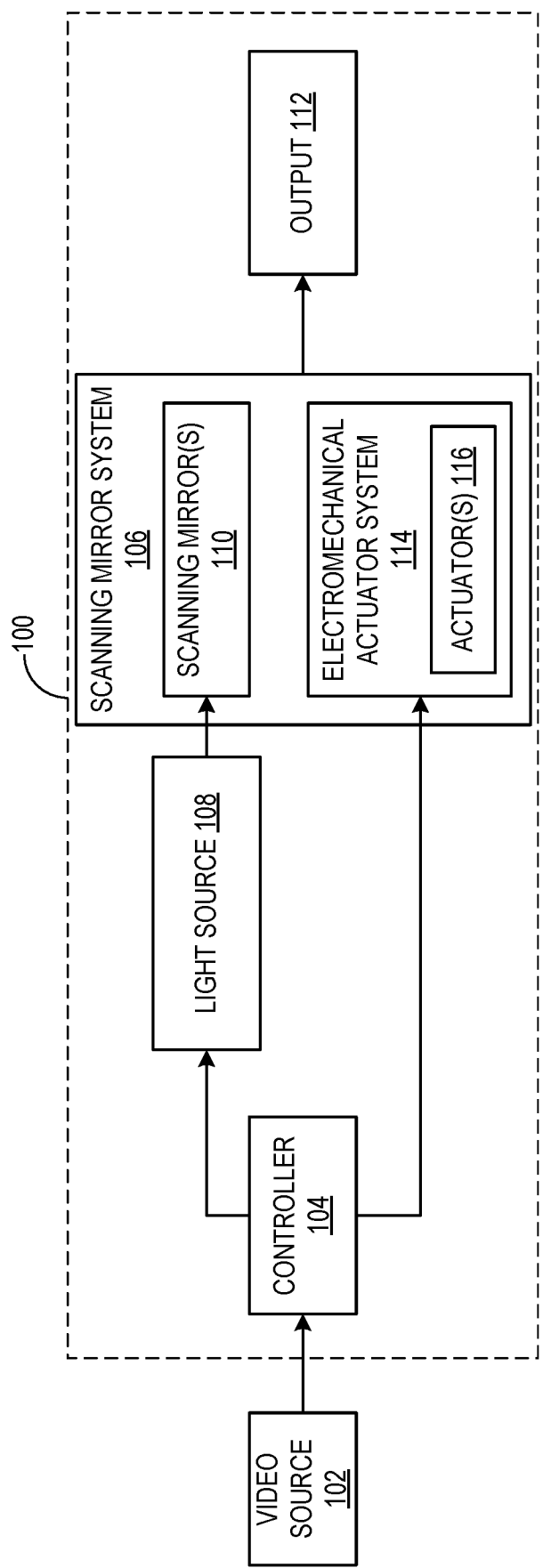
FIG. 1 schematically shows an example display device.

FIG. 1 schematically shows an example display device 100 in communication with a video source 102. Display device 100 includes a controller 104 operatively coupled to a scanning mirror system 106 and to a light source 108. Controller 104 is configured to control light source 108 to emit light based on video image data received from video source 102. Light source 108 may include any suitable light-emitting element(s), such as one or more lasers, and may output light in any suitable wavelength ranges, such as red, green, and blue. In other examples, light source 108 may output substantially monochromatic light, or other wavelength bands than red/green/blue.

Scanning mirror system 106 comprises one or more scanning mirrors 110 controllable to vary an angle at which light from the light source is reflected to thereby scan an image. As mentioned above, the scanning mirror system 104 may include a single mirror driven in both horizontal and vertical directions, or two mirrors separately driven in horizontal and vertical directions. Light reflected by scanning mirror system 106 is directed toward an output 112 for display of a scanned image. Output 112 may take any suitable form, such as projection optics, waveguide optics, etc. As examples, display device 100 may be configured as a virtual reality head-mounted display (HMD) device with output 110 configured as an opaque surface, or as an augmented reality HMD device with the output configured as a see-through structure that allows virtual imagery to be combined with a view of the surrounding real-world environment. Display device 100 also may assume other suitable forms, such as that of a head-up display, mobile device screen, monitor, or television, as examples.

Scanning mirror system 106 further includes an electromechanical actuator system 114 comprising actuator(s) 116 to effect movement of the scanning mirror(s) 110. Various type of actuators may be used to control a MEMS mirror system. With regard to the slow scan direction, electromagnetic actuators may offer relatively good linearity of tilt angle versus applied signal amplitude, and thus may be suitable for use with a sawtooth/ramp-like trajectory control waveform.

However, higher frequency components of sawtooth or ramp control waveforms may cause problems related both to the MEMS mirror and to the mirror driver amplifier. To help address such problems, a scanning mirror control system may utilize low pass filtering or frequency domain synthesizing to construct a target control trajectory waveform having less high frequency information. However, such processing may impact the linearity of the mirror response to the control signal and/or introduce undesirable delay. Either of these effects may degrade display quality and/or and fail to provide fast and accurate dynamic positioning.

Accordingly, examples are disclosed that relate to the time-domain synthesis of a mirror control waveform. As described in more detail below, the disclosed examples provide a control waveform that includes a linear portion with a pre-selected time duration corresponding to the mirror scan, and a retrace portion stitched to the linear portion. The resulting waveform may be continuous with regard to position and velocity changes during MEMS movement, may exhibit more than 40 dB attenuation from the fundamental to the tenth harmonic in the frequency domain, and may allow for arbitrary positioning of each frame. Due at least in part to the attenuation of higher frequency components, the example time-domain waveform syntheses disclosed herein may help to diminish stress to the mirror and prevent mirror breakage, thus improving lifetime and performance of the driver and system.

Figure 2:
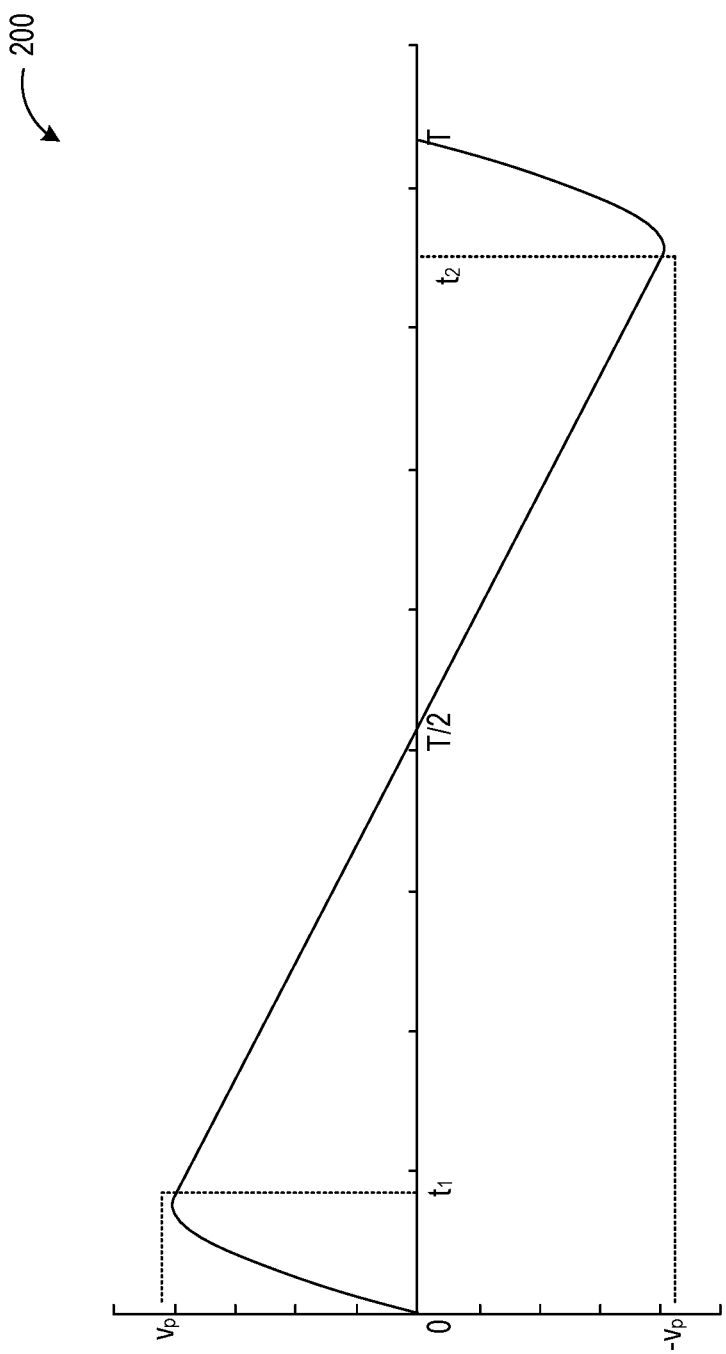
FIG. 2 shows an example time-domain synthesized mirror target trajectory waveform.

FIG. 2 shows an example time-domain synthesized mirror target trajectory waveform 200. The target trajectory waveform comprises a linear raster scan portion during a time interval ($t_1$, $t_2$), which is defined as duty cycle d, and a retracing portion that returns the mirror to the $t_1$ position from the $t_2$ position. The retracing of the mirror may be non-linear, and is configured to have a magnitude of $\pm v_p$ at $t_1$ and $t_2$ moments. The function for the interval ($t_1$, $t_2$) maintains a substantially constant linear slope, while the function for the retracing interval may provide a substantially similar position and derivative (MEMS velocity) at $t_1$ and $t_2$.

Various functions may be used to meet the criteria mentioned above for the retrace portion of the target waveform. In some examples, a trigonometric function, such as a sine or cosine function, may be used for the retrace portion. An example of such a function is shown below in equation (1). The derivation of the function parameters is shown below in equation (2). In these expressions, $\omega$ comprises a frequency of the sine wave, A comprises an amplitude of the sine wave, and T is the period representing a complete cycle of the waveform.

$$A * \sin(\omega \cdot t_1) = v_p \quad (1)$$

$$A * \omega * \cos(\omega \cdot t_1) = -\frac{2 v_p}{T \cdot d} \quad (2)$$

Combining the above two equations (1) and (2) results in the following:

$$\omega * \cot(\omega \cdot t_1) = -\frac{2}{T \cdot d} \quad (3)$$

Both sides may be multiplied with $t_1$, which may also be expressed as $$t_1 = \frac{1-d}{2} \cdot T$$

due to the symmetry of the waveform. The Taylor approximation then may be applied to obtain the following equation:

$$(\omega \cdot t_1) * \cot(\omega \cdot t_1) = 1 - \sum_{n=1}^{\infty} (-1)^{n-1} \cdot 2^{2n} \cdot B_{2n} \cdot \frac{(\omega \cdot t_1)^{2n}}{(2n)!} \approx \quad (4)$$

$$1 - 2^2 \cdot B_{21} \cdot \frac{(\omega \cdot t_1)^2}{2!} + 2^4 \cdot B_{22} \cdot \frac{(\omega \cdot t_1)^2}{4!} = \frac{d-1}{d}$$

Given the Bernoulli Number $B_{21}=\frac{1}{6}$ and $B_{22}=-\frac{1}{30}$, the frequency of the sine wave may be represented as:

$$\omega = \frac{1}{T} \cdot \frac{\sqrt{2 \cdot \left(\sqrt{225 + \frac{180}{d}} - 15\right)}}{1-d} \quad (5)$$

Further, the amplitude of the sine wave may be represented as:

$$A = \frac{v_p}{\sin\left[\frac{\omega \cdot (1-d) \cdot T}{2}\right]} \quad (6)$$

Using these expressions, for given values of frame frequency, duty cycle of the scanning interval, and peak value of the position, the amplitude and frequency of the sine wave may be computed, and the resulting wave may be stitched to the linear portion of the control waveform at $t_1$ and $t_2$. With the resulting time-domain synthesized waveform, both the mirror position and derivative of the mirror position may be continuous over the whole period. While the example above utilizes sine/cosine functions, in other examples, the retrace portion may be determined using any other suitable trigonometric functions. In some examples, the retrace portion may be computed in real time, while in other examples, the retrace portion may be obtained from a lookup table having precomputed values.

Figure 3:
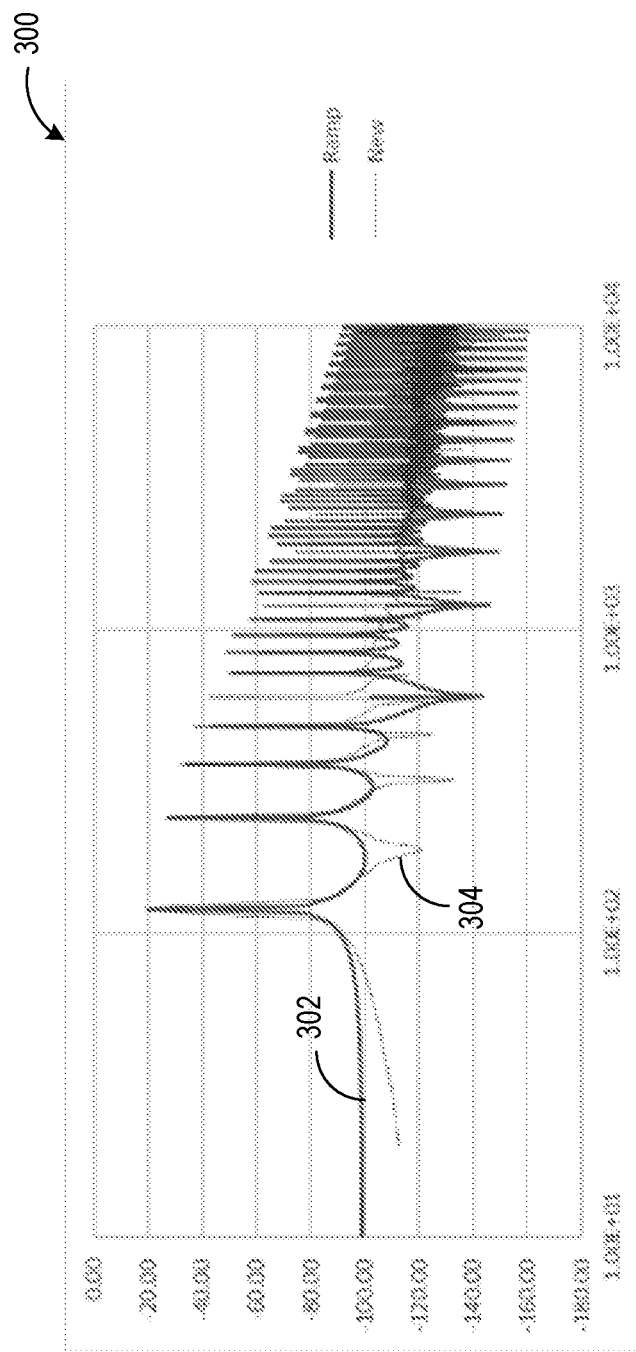
FIG. 3 shows a plot of a fast Fourier transform of a 120 Hz sawtooth with 80% duty cycle compared to an example time-domain synthesized waveform.

FIG. 3 shows a comparison 300 of a plot of a fast Fourier transform (FFT) 302 of a 120 Hz sawtooth with 80% duty cycle ("Ramp" in the FIG. 3 legend) compared with an FFT of the proposed waveform 304 with the same linear time interval and 120 Hz frequency ("New" in the FIG. 3 legend). As shown, the high frequency components of the proposed waveform 304 are lower in amplitude than those of the ideal sawtooth waveform. Thus, a time-domain synthesized control waveform as disclosed herein may help to avoid MEMS mirror system problems arising from such high frequency components.

Figure 4:
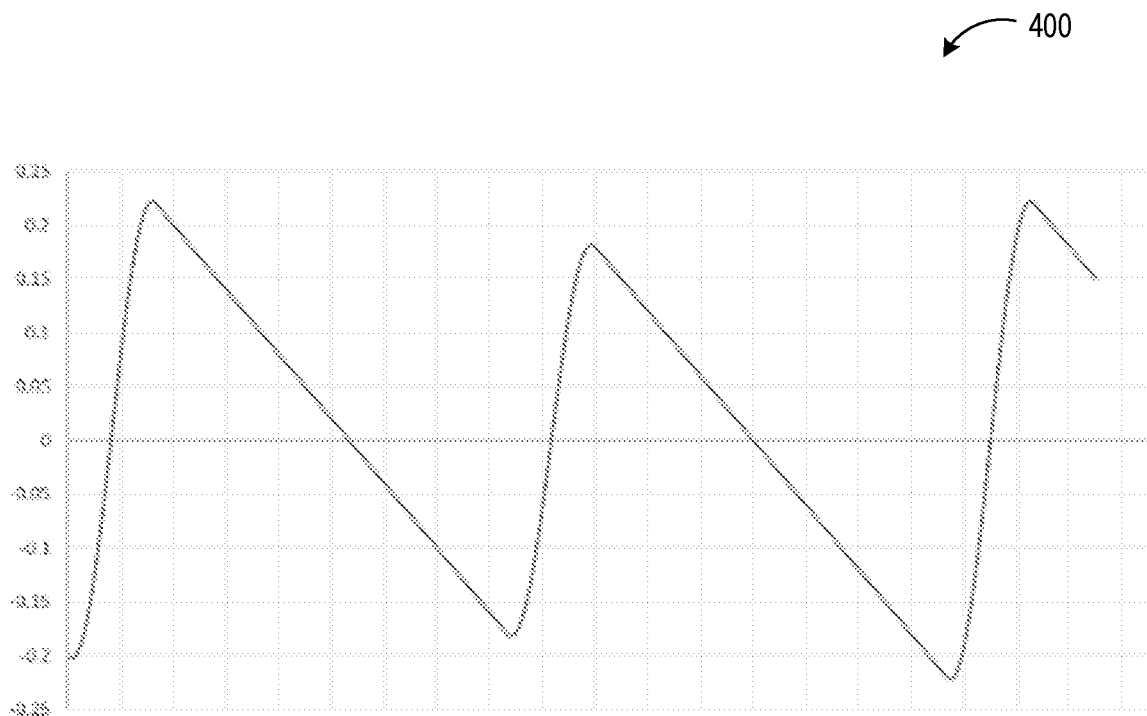
FIG. 4 shows an example time-domain synthesized waveform with ±10% variation in position for each frame.

The above-described waveform may be applied to any arbitrary position of a next frame. For example, at the conclusion of a scan, the transition sine function (or other suitable transition function) may be evaluated for the expected starting position and time of next scan. In addition to the frequency co and amplitude A, offset and phase delay also may be determined to help adjust a scan position, for example by determining boundary conditions regarding position and velocity continuity for both current frame ending points and next frame starting points. Where the time durations of vertical mirror scans are consistent from frame to frame, then the same frequency and phase delay may be applied from frame to frame. In this instance, determination of the amplitude and offset may be sufficient to adjust the frame position, thereby resulting in less real-time computation than where the frequency and phase delay are also computed. FIG. 4 shows an example waveform synthesized as described above, and illustrates a 10% variation of positions along the time axis (horizontal axis) between frame achieved by controlling the amplitude and offset. More generally, the disclosed example time-domain waveform syntheses may be applied to any arbitrary position for a next frame of a different starting position, scan time interval, and MEMS movement slope by determination of these four variables.

Figure 5:
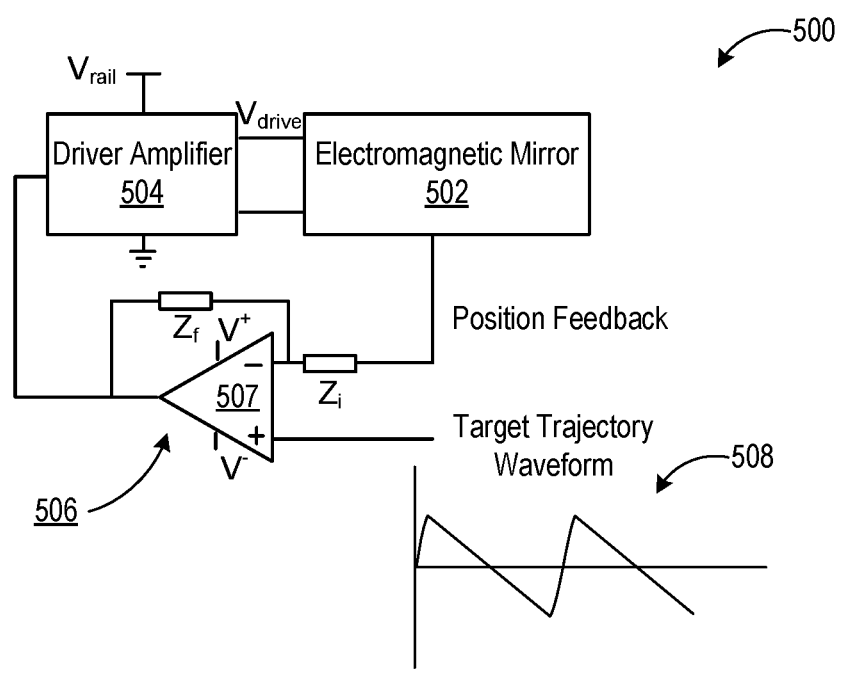
FIG. 5 schematically shows an example electromagnetic mirror driver circuit.

To control the mirror, the synthesized waveform is provided to a mirror driver circuit. FIG. 5 shows an example mirror driver circuit 500 including an electromagnetic mirror system 502, a driver amplifier 504, and a controller amplifier stage 506 comprising an operational amplifier 507. The driver amplifier 504 may be a linear amplifier, a class-D switching amplifier, or any other suitable type of amplifier. Although described herein in the context of electromagnetically driven mirrors, it will be understood that the same examples may also apply to electrostatically driven mirrors and/or any other suitable mirror driving mechanisms.

Mirror position feedback in the form of a direct electrical signal from the MEMS mirror system 502 is fed to the inverting input of the operational amplifier 507 of the controller amplifier stage 506, and the time-domain synthesized target trajectory waveform 508 is fed to the non-inverting input of the operational amplifier 507. The controller amplifier stage 506 outputs a signal with a gain that is a function of the difference between the mirror position signal and the target waveform 508. The output of the controller amplifier stage 506 comprises a control signal that is provided to the driver amplifier 504, which amplifies the power of the signal via voltage source $V_{rail}$ to drive the MEMS mirror 502 via signal $V_{drive}$. The new mirror position is fed as a signal back to the controller amplifier 506, and the output of the controller amplifier 506 is input to the driver amplifier 504 once again to adjust the MEMS mirror 502 accordingly, in a closed loop fashion. The controller amplifier stage 506 may comprise a proportional-derivative (PD) controller, a proportional-integral-derivative (PID) controller, a lead-lag controller, or as any other suitable control circuit. An example PD controller circuit is described in more detail below. The mirror driver circuit 502 may be configured to provide high gain at the operation frame frequency and high bandwidth, to thereby facilitate the control of the mirror position with suitably high accuracy and fast response.

The mirror driver circuit 500 may be implemented in the analog domain, as opposed to the digital domain. Implementing the mirror driver circuit 500 in the analog domain may help to avoid the use of analog-to-digital converters (ADCs) and/or digital-to-analog converters (DACs). In the digital domain, ADCs and DACs may need to utilize a high sample rate to provide high-quality control signal reconstruction, which may introduce delay into the feedback loop. In contrast, the driver circuit 500 may avoid such high-speed ADCs and DACs (but may utilize a low-speed DAC to convert the target waveform, which may be stored as a digital signal, to an analog signal).

Figure 6:
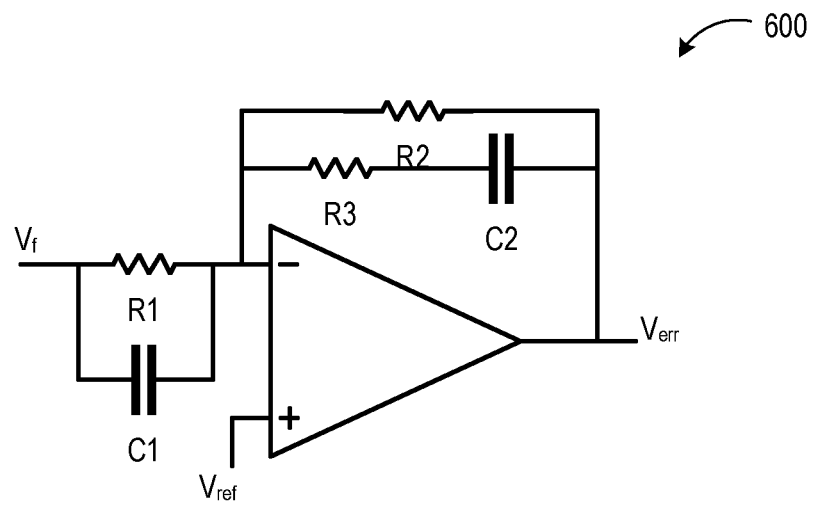
FIG. 6 schematically shows an example proportional-derivative (PD) controller circuit.

As mentioned above, various types of control circuits may be used, including but not limited to PID, PD, and lead-lag controllers. FIG. 6 schematically shows an example PD controller circuit that may be implemented in the driver circuit 500 of FIG. 5. In this figure, the parallel arrangement of C1 and R1 corresponds to $Z_i$ of FIG. 5, R2 in parallel with the series arrangement of R2 and C2 corresponds to $Z_f$ of FIG. 5, $V_{ref}$ corresponds to the target trajectory waveform input in FIG. 5, and $V_{err}$ corresponds to the control signal output by control amplifier stage 506 of FIG. 5.

Figure 7:
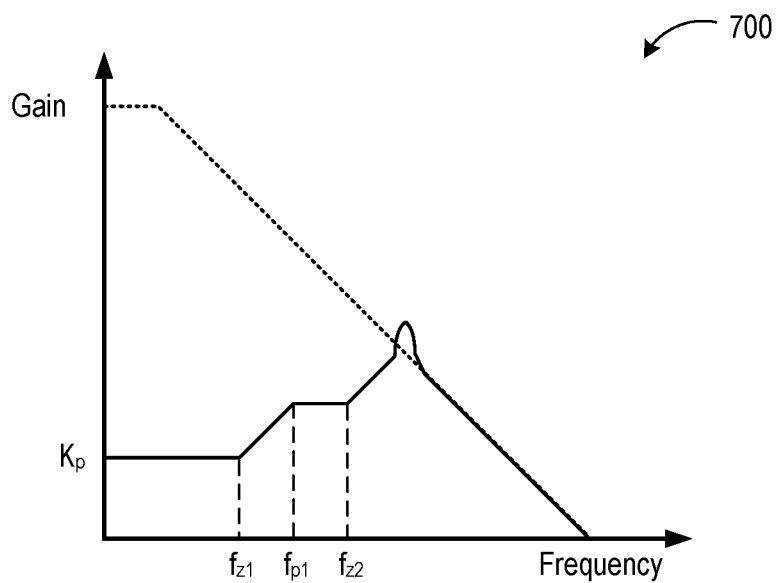
FIG. 7 shows a gain Bode plot for the PD controller of FIG. 6.

FIG. 7 shows a gain Bode plot for the example PD controller of FIG. 6. Based on the operation frequency and mirror impedance, the mirror driving controller may be configured to provide the following characteristics: (1) no integrator pole, as the operation frequency ($f_f$) may be within 60-120 Hz during normal mirror operation, and high DC gain may not be desired; (2) a zero formed by R1 and C1 located near the first resonance frequency of the mirror (f1), as in equation (7); a loop gain cross-over frequency (fc) between the first and second resonance frequency of mirror (f2); and a zero-pole pair formed by R2, R3, and C2, which are positioned before and after the cross-over frequency, as in equations (8) and (9).

$$f_{z1} = \frac{1}{2\pi R_1 C_1} \approx f_1 \quad (7)$$

$$f_{p1} = \frac{1}{2\pi (R_2 + R_3) C_2} \in (f_1, f_c) \quad (8)$$

$$f_{z2} = \frac{1}{2\pi R_3 C_2} \in (f_c, 4f_c) \quad (9)$$

Figure 8:
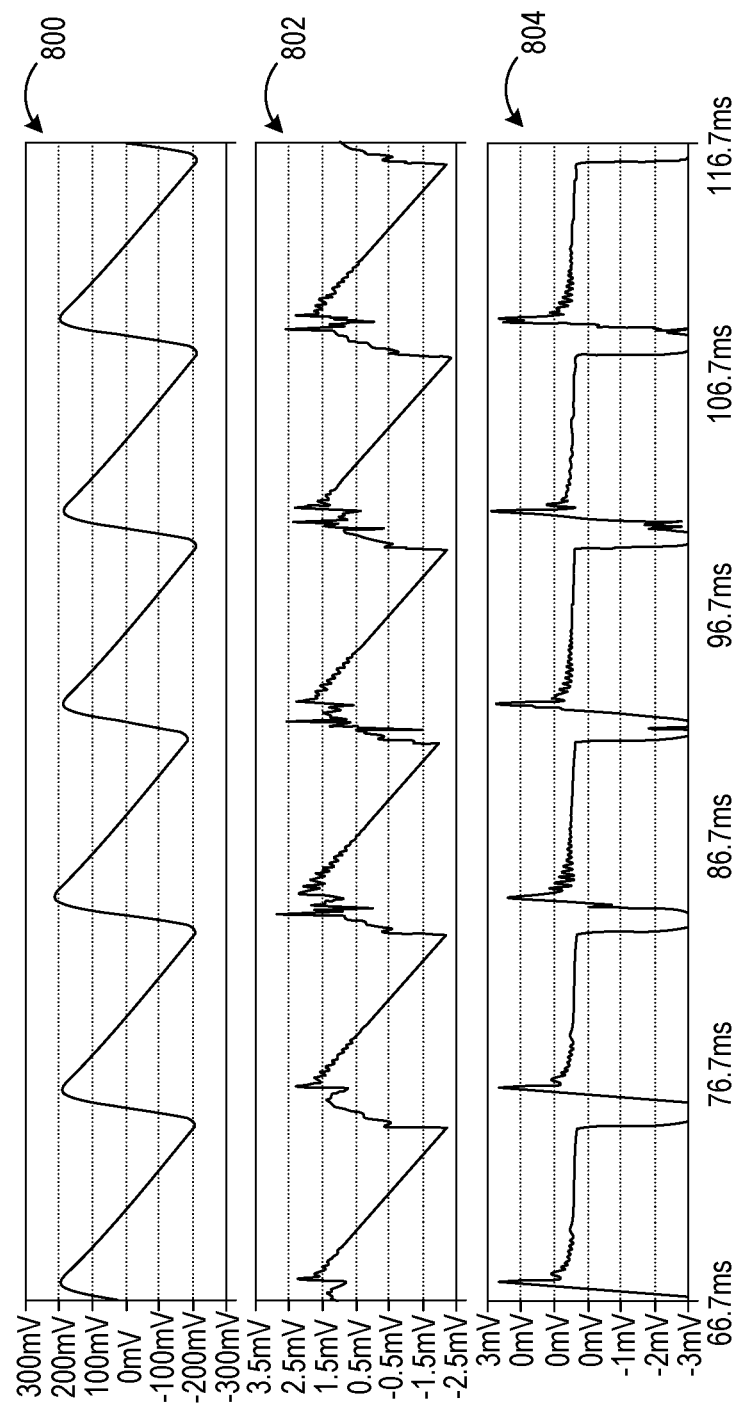
FIG. 8 shows example results of simulation experiments performed based upon the circuit of FIG. 5 using the PD control circuit of FIG. 6.

FIG. 8 shows example results of simulation experiments performed based upon the circuit of FIG. 5 using the PD control circuit of FIG. 6. In these simulations, the driver amplifier was represented as a gain block with a higher bandwidth than the desired operation frequency. Further, the electromagnetic mirror was represented by an electrical-mechanical equivalent circuit, which captures the frequency response of the mirror assembly. Mechanic resonances may be modeled by multiple electrical equivalent parallel and/or series LCR (resistor, inductor, and capacitor) resonances. Waveform 802 shows the mirror movement feedback signal, waveform 804 shows an example output of a closed-loop controller and driver amplifier of the MEMS mirror (e.g. driver amplifier 504), and waveform 806 shows the error between the target and the feedback signals. As can be seen, the time-domain synthesized waveform produces a continuous mirror position and movement in this simulation, and the error between the target and feedback signals indicates that the mirror position closely tracks the synthesized waveform.

The example mirror driving schemes disclosed herein using time-domain synthesis of a target trajectory waveform may help to reduce MEMS stress by providing a continuous mirror position and derivative. Further, the disclosed control circuitry, used in combination with a time-domain synthesized signal as disclosed, may help to ensure static accuracy and dynamic response of mirror position via closed-loop feedback control.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
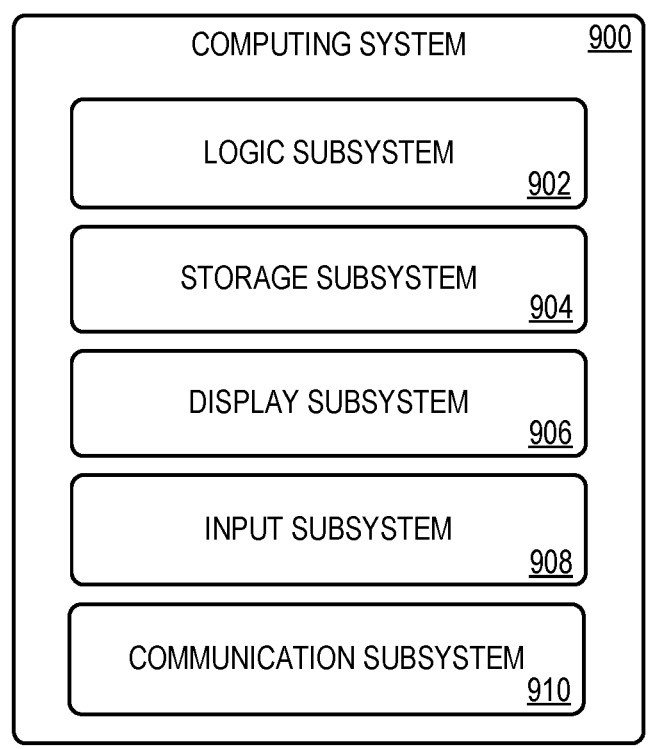
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic subsystem 902 and a storage subsystem 902. Computing subsystem 902 may optionally include a display subsystem 906, input subsystem 908, communication subsystem 910, and/or other components not shown in FIG. 9. Computing system 900 may represent one or more of display device 100 and controller 104, as examples.

Logic subsystem 902 includes one or more physical devices configured to execute instructions. For example, the logic subsystem 902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 902 may include one or more processors configured to execute software instructions. Additionally or alternatively, the logic subsystem 902 may include one or more hardware or firmware logic machines configured to execute hardware or firmware instructions. Processors of the logic subsystem 902 may be single-core or multi-core, and the instructions executed thereon may be configured for sequential, parallel, and/or distributed processing. Individual components of the logic subsystem 902 optionally may be distributed among two or more separate devices, which may be remotely located and/or configured for coordinated processing. Aspects of the logic subsystem 902 may be virtualized and executed by remotely accessible, networked computing devices configured in a cloud-computing configuration.

Storage subsystem 904 includes one or more physical devices configured to hold instructions executable by the logic subsystem 902 to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem 910 may be configured for communication via a wireless telephone network, or a wired or wireless local- or wide-area network. In some embodiments, the communication subsystem 910 may allow computing system 900 to send and/or receive messages to and/or from other devices via a network such as the Internet.

Another example provides a display device, comprising a light source, a scanning mirror system configured to scan light from the light source, and a controller configured to control the scanning mirror system to scan the light by synthesizing in a time domain a mirror control waveform that comprises a linear scan portion and a retrace portion stitched to the linear scan portion, the mirror control waveform being continuous and having an arbitrary timing that is adjustable by the controller between scan cycles. The controller may additionally or alternatively be configured to compute the retrace portion in real time based upon a current position of the scanning mirror system at an end of a current frame and a target position of the scanning mirror system for a next frame. The controller may additionally or alternatively be configured to obtain the retrace portion from a lookup table having precomputed values. The retrace portion may additionally or alternatively include a trigonometric function. The retrace portion may additionally or alternatively include a sine or cosine function. The linear portion may additionally or alternatively include a pre-selected duty cycle. The display device may additionally or alternatively include a closed-loop control circuit configured to control power provided to a driver amplifier of the scanning mirror system based upon position feedback from the scanning mirror system and the mirror control waveform. The closed-loop control circuit may additionally or alternatively include a proportional-derivative (PD) controller and is configured to control the scanning mirror system based on analog feedback. Additionally or alternatively, a frequency domain transform of the retrace portion of the mirror control waveform may include 40 dB or more attenuation from the fundamental to the tenth harmonic.

Another example provides a method of controlling the display of images on a display device, the method comprising controlling a light source to output light, scanning the light from the light source via a scanning mirror system by synthesizing in a time domain a mirror control waveform that comprises a linear scan portion and a retrace portion stitched to the linear scan portion, the mirror control waveform being continuous and having an arbitrary timing that is adjustable by the controller between scan cycles. Synthesizing the mirror control waveform may additionally or alternatively include computing the retrace portion in real time based upon a current position of the scanning mirror system at an end of a current frame and a target position of the scanning mirror system for a next frame. Synthesizing the mirror control waveform may additionally or alternatively include obtaining the retrace portion from a lookup table having precomputed values. The retrace portion may additionally or alternatively include a trigonometric function. The method may additionally or alternatively include providing a control signal to a driver amplifier of the scanning mirror system based upon position feedback from the scanning mirror system and the mirror control waveform. The method may additionally or alternatively include controlling the scanning mirror system based on analog feedback. Additionally or alternatively, a frequency domain transform of the retrace portion of the mirror control waveform may include 40 dB or more attenuation from the fundamental to the tenth harmonic. Another example provides a display device, comprising a light source, a scanning mirror system configured to scan light from the light source in a first direction at a first, higher scan rate, and in a second direction at a second, lower scan rate, and a controller configured to control the scanning mirror system to scan the light by synthesizing in a time domain a mirror control waveform that comprises (a) a linear scan portion and (b) a retrace portion comprising a trigonometric function and stitched to the linear scan portion, the mirror control waveform being continuous and having an arbitrary timing that is adjustable by the controller between scan cycles. The controller may additionally or alternatively be configured to compute the retrace portion in real time based upon a current position of the scanning mirror system at an end of a current frame and a target position of the scanning mirror system for a next frame. The controller may additionally or alternatively be configured to obtain the retrace portion from a lookup table having precomputed values. The display device may additionally or alternatively include a closed-loop control circuit configured to control power provided to a driver amplifier of the scanning mirror system based upon position feedback from the scanning mirror system and the mirror control waveform.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device, comprising:
   a light source;
   a scanning mirror system configured to scan light from the light source;
   a scanning mirror driver circuit comprising a controller amplifier stage including an operational amplifier; and
   a controller configured to control the scanning mirror system to scan the light by,
      for a scan of a current frame,
         evaluating the scanning mirror system for an expected starting position of a next scan for a next frame based on determining boundary conditions regarding position and velocity continuity for ending points of the current frame and starting points of the next frame,
         determining a retrace portion of a mirror control waveform based upon the expected starting position of the next scan,
         synthesizing in a time domain the mirror control waveform by stitching the retrace portion to a predetermined linear scan portion, and
         providing the mirror control waveform to a first input of the operational amplifier, wherein a second input of the operational amplifier receives input in the form of an analog mirror position feedback signal from the scanning mirror system.

2. The display device of claim 1, wherein the controller is configured to compute the retrace portion in real time based upon a current position of the scanning mirror system at an end of the current frame and a target position of the scanning mirror system for the next frame.

3. The display device of claim 1, wherein the controller is configured to obtain the retrace portion from a lookup table having precomputed values.

4. The display device of claim 1, wherein the retrace portion is comprises a trigonometric function.

5. The display device of claim 4, wherein the retrace portion comprises a sine or cosine function.

6. The display device of claim 1, wherein the linear portion comprises a pre-selected duty cycle.

7. The display device of claim 1, wherein the scanning mirror driver circuit comprises a proportional-derivative (PD) controller.

8. The display device of claim 1, wherein a frequency domain transform of the retrace portion of the mirror control waveform comprises 40 dB or more attenuation from the fundamental to the tenth harmonic.

9. A method of controlling the display of images on a display device, the method comprising:
   controlling a light source to output light; and
   scanning the light from the light source via a scanning mirror system by,
      for a scan of a current frame,
         evaluating the scanning mirror system for an expected starting position of a next scan for a next frame based on determining boundary conditions regarding position and velocity continuity for ending points of the current frame and starting points of the next frame,
         determining a retrace portion of a mirror control waveform based upon the expected starting position of the next scan,
         synthesizing in a time domain the mirror control waveform by stitching the retrace portion to a predetermined linear scan portion, the mirror control waveform being continuous in position and derivative across plural image frames, and
         providing the mirror control waveform to a first input of an operational amplifier, wherein a second input of the operational amplifier receives input in the form of an analog mirror position feedback signal from the scanning mirror system.

10. The method of claim 9, wherein synthesizing the mirror control waveform comprises computing the retrace portion in real time based upon a current position of the scanning mirror system at an end of the current frame and a target position of the scanning mirror system for the next frame.

11. The method of claim 9, wherein synthesizing the mirror control waveform comprises obtaining the retrace portion from a lookup table having precomputed values.

12. The method of claim 9, wherein the retrace portion comprises a trigonometric function.

13. The method of claim 9, wherein the operational amplifier is part of a closed-loop control circuit comprising a proportional-derivative (PD) controller.

14. The method of claim 9, wherein a frequency domain transform of the retrace portion of the mirror control waveform comprises 40 dB or more attenuation from the fundamental to the tenth harmonic.

15. A display device, comprising:
 a light source;
 a scanning mirror system configured to scan light from the light source in a first direction at a first, higher scan rate, and in a second direction at a second, lower scan rate;
 a scanning mirror driver circuit comprising a controller amplifier stage including an operational amplifier; and
 a controller configured to control the scanning mirror system to scan the light based on analog feedback by, for a scan of a current frame,
  evaluating the scanning mirror system for an expected starting position of a next scan for a next frame based on determining boundary conditions regarding position and velocity continuity for ending points of the current frame and starting points of the next frame,
  determining a retrace portion of a mirror control waveform based upon the expected starting position of the next scan,
  synthesizing in a time domain the mirror control waveform by stitching the retrace portion to a predetermined linear scan portion, the mirror control waveform being continuous in position and derivative across plural image frames, and
  providing the mirror control waveform to a first input of the operational amplifier, wherein a second input of the operational amplifier receives input in the form of an analog mirror position feedback signal from the scanning mirror system.

16. The display device of claim 15, wherein the controller is configured to compute the retrace portion in real time based upon a current position of the scanning mirror system at an end of the current frame and a target position of the scanning mirror system for the next frame.

17. The display device of claim 15, wherein the controller is configured to obtain the retrace portion from a lookup table having precomputed values.

18. The display device of claim 15, wherein the operational amplifier is part of a closed-loop control circuit configured to control power provided to a driver amplifier of the scanning mirror system based upon the mirror position feedback from the scanning mirror system and the synthesized mirror control waveform.

* * * * *